June 10, 1952  G. McLARTY  2,599,569
APPARATUS FOR MODIFYING THERMOSTAT OPERATION
Filed May 20, 1948
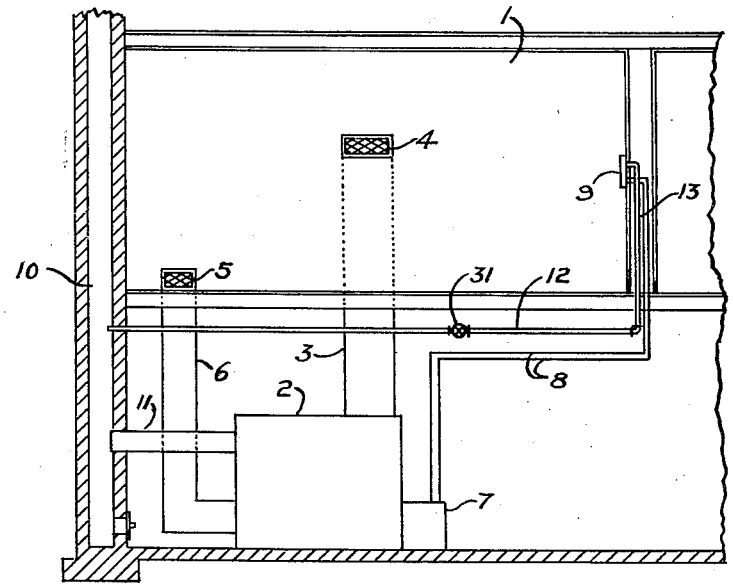
Fig-I
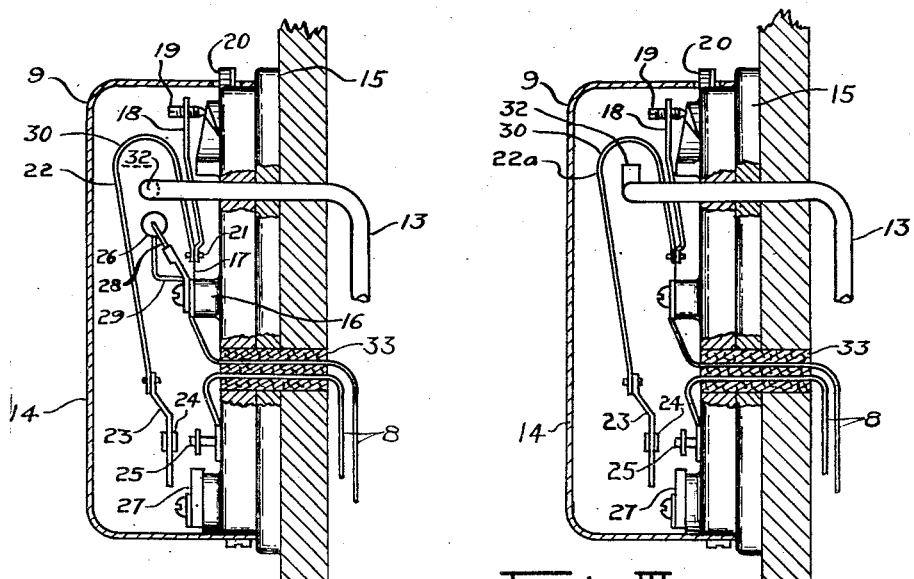
Fig-II  Fig-III
INVENTOR
GORDON McLARTY
BY Roy A. Plant
ATTORNEY Patented June 10, 1952

2,599,569

UNITED STATES PATENT OFFICE 2,599,569

APPARATUS FOR MODIFYING THERMO-
STAT OPERATION

Gordon McLarty, Battle Creek, Mich.

Application May 20, 1948, Serial No. 28,244

3 Claims. (Cl. 200—122)

The present invention relates broadly to temperature controlling, and in its specific phases to modification of the action of thermostats of the common type utilizing electric resistance heat, whereby closer or more positive control of heating systems may be attained.

It is recognized that for best results in mild weather, a thermostat must give short "on" periods of heating plant operation so that the "off" intervals will also be short, since this is necessary for maximum comfort and avoidance of what is known as "cold 70." On the other hand, it is necessary to have longer "on" periods in cold weather for fuel economy and adequate heat supply. However, if the thermostat is such that it gives relatively short "on" periods under all weather conditions, such thermostat will hold the "on" period in cold weather too short so that heating efficiency is impaired and a heating plant which otherwise would supply ample heat, either will not supply enough heat, or will cause poor distribution of the heat produced. Short "on" periods in cold weather will also cause the starters, and the controls, as well as the motor operating the burner and/or fan, where same is used, to operate so often that their life will be shortened. In colder weather longer "on" periods are desirable, not only for fuel economy and comfort but also because the heating system structures heat up more slowly and cool down more rapidly than in mild weather while staying within the comfort range of temperature variation, which is 1½ degrees F. for most people. In mild weather, with electrical resistance heated heat anticipation thermostats, which are the common ones used, one cannot keep within the desired 1½ degree F. room temperature variation range unless the thermostat operates to control the heating plant with a room temperature rise of approximately a ¼ degree F., because above this operating range the heat generated in the heating plant will be stored and not dissipated fast enough, thus causing an overshoot of temperature, perhaps to the extent of three degrees F. or more, and this is very pronounced with solid fuel heating systems, steam systems, hot water systems, and panel heating systems. This makes it necessary to modify the action of the conventional thermostats having heating units, in order to make them operate so as to closely meet the requirements of varying weather conditions.

It should be noted that one reason why heaters are used in thermostats is that commercial thermostats, without heaters, have not been made which will operate dependably on a ¼ degree F. change in room temperature. When thermostats, either with or without a heater, are adjusted to operate on much below a 1 degree F. range of temperature variation, they become subject to chatter from vibration such as is caused by walking near the thermostat, closing doors, et cetera. Heaters also cause movement of air inside of the thermostat housing which aids in producing quick response of the thermal element in the thermostat. It must be remembered that these electric heaters, which operate only when the thermostat contacts of the two wire systems are closed, generate enough heat in a predetermined length of time to anticipate a room temperature rise and cause the thermostat unit to operate and shut off the operation of the heating plant. The operation of the thermostat is thus only partially dependent upon a rise in room temperature. Where the heater in the thermostat is too active, the thermostat may prevent any rise in room temperature, or even cause it to drop in extremely cold weather, due to cutting off the heating plant too quickly.

To help overcome some of these difficulties, some thermostats have a small permanent magnet which attracts a steel member on the end of the bimetal thermal element and snaps the electric contacts together when the circuit is to be closed and yet allows them to snap open when the circuit is to be broken, thus keeping the contact points clean. Some of these thermostats provide for the endwise manual adjustment of the contact point mounted on the thermostat base, to different elevations relative to the magnet, to permit shifting the thermostat characteristics so that it operates on the "on" position longer at one setting, which would better meet cold weather conditions, and shorter for another manual setting, such as would better meet mild weather conditions. Neither setting, however, is suitable for the other weather condition since the operating time will either be too long or too short.

There is another type of thermostat which utilizes a three wire circuit and which gives longer "on" periods in cold weather, but will not give short enough "on" periods in mild weather, because the thermostat heater does not influence the length of the "on" period, but rather is used to shut the thermostat controlled heating plant off after the thermostat has a rise of about 1 degree F. due to room temperature increase. This is unsatisfactory since to hold a heating plant in operation until there is a rise of 1 degree F. in room temperature will many times cause an overshoot of temperature, and particularly so under mild weather operating conditions.

Where hot water systems and panel heating systems are used, the "on" periods should be made so short in mild weather that there will practically be no rise in room temperature before the thermostat shuts off the heating plant, since otherwise the heat storage capacity of the system will cause an undesirable override of room temperature. It is thus necessary to use a heater in the thermostat to anticipate the temperature rise before same reaches a point where the override will occur. The automatic controlling of the thermostat to meet varying weather conditions thus becomes exceptionally important with systems of this type.

Another drawback to the common two wire heater type thermostats, or any thermostat which has a heater, is called "droop." This is the result of the difference between room temperature and the temperature of the air passing over the thermostatic bimetal thermal element regardless of whether there is a separate heating unit or whether the bimetal thermal element supplies the heat itself. When the thermostat is operating frequently, as in cold weather, the heat given off by the thermostat heater, or even the thermal element itself, causes this "droop." In other words, to get a temperature of 75 degrees F. in a room, the thermostat would have to be set higher in cold weather than in mild weather in order to overcome this "droop" effect. This again makes manual adjustment for the weather necessary with present day thermostats in order to provide satisfactory operating conditions. It was a recognition of these and other shortcomings of the present day thermostat controls for heating plants and the like which led to the conception and development of the present invention.

Accordingly among the objects of the present invention is the provision of a method and apparatus for automatically controlling a heating plant thermostat so that it has suitably short "on" periods of operation in mild weather and progressively longer "on" periods when the weather becomes progressively colder, or colder and windy, such cold weather "on" periods being longer than are obtainable with standard heat anticipation thermostats alone.

Another object is to cause room air to be passed through the thermostat instrument for more positive control of room temperature.

Another object is to slow down or substantially stop the effect of the heater in a thermostat instrument in cold or windy weather in order to diminish or eliminate "droop" or "false reading."

Another object is to automatically allow the effect of the heater in the thermostat instrument to be a little more active than usual in mild weather, as compared with cold weather, in order to give shorter "on" periods, and correspondingly shorter "off" periods, for greater comfort.

Another object is to automatically diminish the effective action of the heater in a thermostat instrument during cold, or cold and windy, weather so as to give longer "on" periods at those times for fuel saving and increased life of the electrical and mechanical controls, and moving parts of the heating plant system.

Another object is to provide an apparatus for automatically controlling thermostat instruments to give short "on" periods of operation of the heating plant in mild weather and longer "on" periods for cold weather while keeping such control apparatus exceptionally simple and positive in action.

A further object is to provide a simple thermostat instrument control device which is relatively inexpensive, and easy to install and adjust initially, following which it is automatic in operation.

Still further objects and advantages of the invention will appear as the description proceeds.

To the accomplishment of the foregoing and related ends, the invention, then, consists of the method and means hereinafter fully described and particularly pointed out in the claims, the annexed drawing and the following description setting forth in detail certain means and modes of carrying out the invention, such disclosed means and modes illustrating, however, but several of the various ways in which the principle of the invention may be used.

In the annexed drawing:

Figure 1 shows in diagrammatic manner a portion of a building with heating plant and thermostat connected for operation in accordance with the present invention.

Figure 2 shows a partially sectioned thermostat assembly adapted for use as shown in Figure 1.

Figure 3 shows a partially sectioned thermostat assembly of a modified form adapted for use as shown in Figure 1.

It is well recognized that the draft through a furnace chimney in mild weather is relatively light and that this draft increases substantially proportionately with decrease in temperature outdoors relative to the temperature of the indoor area to be controlled. It is also well recognized that in cold weather the draft increases substantially in step with increase in outdoor wind velocity. The apparatus of the present invention utilizes this natural phenomenon to automatically control the operation of a thermostat instrument to produce short "on" periods in mild weather and longer "on" periods during cold or cold and windy weather.

Referring more particularly to Figure 1 of the drawing, it will be noted that room 1, wherein the temperature is to be controlled, is supplied with heat from a heating plant or furnace 2, which, for instance, may be of the hot air type, through a hot air duct 3, terminating in a hot air register 4 within the room. Cold air is returned from the room through cold air register 5 and cold air duct 6 back to furnace 2. This furnace may have a stoker, or oil burner apparatus 7, or any comparable mechanism for feeding fuel to the furnace wherein such fuel feeding apparatus 7 is electrically controlled through conventional electric connections 8 to a thermostat 9 for operation in the usual manner. Instead of using a stoker, or oil burner 7, the latter apparatus may be in the form of a controller for turning on and off a flow of gas to a gas furnace, or for opening and closing the dampers in a hand fired solid fuel burning furnace. The furnace 2 will be connected in usual manner to a chimney 10 by means of a smoke pipe 11.

According to present day operation, thermostat 9 will open or close the electric circuit operating the furnace controls when the temperature within the room varies within predetermined limits, as far as same can be controlled in view of the shortcomings of the standard thermostat apparatus which has been described above. In order to automatically vary the operation of the heater type thermostat instrument, a pipe 12 is connected at one end to chimney 10, which may or may not be the same one to which the furnace is connected, and at its other end to a flexible or thin metal tube 13 which opens into thermostat 9 as will be hereinafter described. With pipe 12 and tubing 13 connected as thus illustrated, it will be noted that in mild weather the suction pressure in chimney 10 will be low and accordingly the rate of flow of air from the thermostat through tubing 13 and pipe 12 will be low. On the other hand, in cold weather or cold and windy weather the suction pressure in chimney 10 will be greater and accordingly the amount of air drawn through the thermostat 9 will be greater.

Referring to Figure 2, the thermostat 9 has the usual perforated cover member 14, and a base member 15. A mounting block 16 on base member 15 has a mild spring 17 conventionally connected thereto, and such spring in turn carries an arm 18 with adjusting screw 19 adapted to be actuated by a temperature control dial member 20. Also connected to spring 17, for instance by means of rivets 21, is a bimetal element which is bent to a substantially U-shape and provided on its free end with a mounting member 23 which carries a contact point 24. This contact point is adapted to be brought into contact with a second contact point 25, mounted on the base member, when the bimetal element 22 moves in coiling direction under lowering temperature. Electrically connected to spring 17 is an electrical heater unit 26 which is connected to one of the pair of wires 8 while the other wire of this pair is connected to contact point 25. The electrical heater unit may be of any conventional type, although the most common ones in use utilize either a carbon resistor or a resistor wire. While U-shaped bimetal elements 22 are the common ones used in thermostats, they are also used in coil form, and in some cases instead of a bimetal element a bellows with a volatile fluid in same is used for this purpose.

Some of the commercial thermostat assemblies now on the market make mounting member 23 out of iron or steel and then use a small horseshoe permanent magnet 27 for snap action make and break of the contact points 24 and 25. In manually controlling the thermostat for varying the "on" periods in accordance with weather conditions, it has been proposed to manually move contact 25 backward slightly for cold weather adjustment so that when the contacts are closed, member 23 will be relatively close to the magnet which will then have a stronger holding power on this member and thus allow a longer "on" period before the contact is broken, and yet permit contact 25 to be manually moved outward so as to decrease the holding effect of the magnet 27 and thus produce shorter "on" periods suitable for use in mild weather. The present invention is designed to overcome the necessity of this manual adjustment and hence the mechanism for moving contact point 25 in and out has not been illustrated.

The electric circuit through the thermostat, as shown in Figure 2, is such that one of the electric connections 8 is joined to contact point 25 while the other is joined through wire 28 to electric heater unit 26 which in turn is connected by wire 29 to spring 17 and thence through bimetal element 22 and mounting member 23 through contact point 24 back to contact point 25, thus completing the electric circuit through the thermostat when the contacts are closed. It is thus obvious that when contacts 24 and 25 are closed, current flowing through the electric heater 26 will cause it to give off heat to slightly warm the bimetal element 22 in manner causing same to uncurl slightly which in turn will open contacts 24 and 25 to break the operating circuit, and thus anticipate a rise in room temperature and check override. If the room has not warmed up appreciably, contact points 24 and 25 will again close due to the reverse movement of the bimetal element 22 when the effect of the heat given off by heating element 26 is overcome. Sometimes there are undesirable air currents in the wall space, and to avoid direct effect of same on the thermostat, any openings from one into the other should be sealed, such as by sealing the opening around wires 8 with packing 33.

Controlling the thermostat automatically to produce short "on" periods in mild weather and longer "on" periods in cold or windy weather can be accomplished by controlling the effect of heater 26 on the bimetal element 22. In accordance with the present invention, a preferred way of accomplishing this is by bending tube 13 so as to place the inlet of same in desired position, preferably above and a little to one side of heating element 26, where it will draw air through the thermostat instrument and carry off part of the heat delivered by heating element 26. In mild weather with a lower suction pressure in chimney 10, the amount of air and heat withdrawn will be very moderate and less than in cold weather when the suction pressure in the chimney is correspondingly higher. The effect of heating element 26 on the bimetal element 22 in mild weather, due to this air flow, will therefore be greater than it will be in cold or cold and windy weather and as a result, the desired continuously variable automatic controlling of the thermostat instrument to short "on" periods in mild weather and progressively longer "on" periods in progressively colder weather will be taken care of.

A modified thermostat instrument is shown in Figure 3 wherein the bimetal element 22a acts directly as a self-heated unit due to its resistance to flow of electricity therethrough. In this case tubing 13 may be bent to various positions but preferably so as to draw air directly from under the hair pin bend 30 of the thermostat bimetal unit 22a which is the most effective point of the unit so far as opening contacts 24 and 25 are concerned. Thus again variation in flow of air through the thermostat instrument and into tube 13 will vary with the suction pressure in chimney 10 and once more automatically control the operation of the thermostat instrument so as to give relatively short "on" periods in mild weather and longer "on" periods in colder or cold and windy weather.

In most cases where the run to the chimney is not too long, pipe 12 may be made from ¾ inch standard pipe, and tubing 13 from one half inch tubing, the upper end of which may be suitably bent so as to pass into thermostat 9 for withdrawing heat. If desired, a few inches of flexible tubing, or even lead tubing, can be joined to the upper end of tube 13 to facilitate bending same to desired inlet position in the thermostat. To give greater flexibility of operation, a valve 31, Figure 1, may be placed in the air suction line so as to permit throttling the air flow to meet special conditions. This valve may be of any conventional type, although a gate valve or a plug valve would be preferable since they would be less subject to plugging with lint drawn into the line.

With the apparatus installed as shown in Figure 2, the thermostat is first adjusted so that it will snap on and off positively at a differential of approximately 1½ degrees F. A heater is selected which will permit the thermostat unit to stay closed for approximately ½ to 3 minutes during mild weather, and then inlet 32 is adjusted to draw air through the thermostat to slightly cool the heater and give an "on" period which will just overcome "cold 70" and overshoot in mild weather for the particular system and fuel which is being worked with. Where the heater is a separate element, as shown in Figure 2, the inlet usually is set above and to one side of the heater so as to draw air through the thermostat directly above the heater, while if the bimetal element itself acts as a heater, as is shown in Figure 3, then air is preferably drawn from directly under the hair pin bend since that is the most active part of the bimetal element. If necessary, valve 31 will be partially closed to control the air flow through the tubing. The apparatus is then in condition to automatically control the heating system since under mild weather conditions, the air flow will be less and its effect on the heating unit 26 will be proportionally reduced so that short "on" periods will prevail. On the other hand, when the weather is cold, more air will be drawn into inlet 32 and hence the heater will have less effect on the bimetal element 22 so that same will stay on longer, thus automatically meeting the heating requirements for that type of weather. Ordinary heat anticipation commercial thermostats will vary the "on" periods from approximately ½ to 8 minutes, while for ideal conditions this range should be broader, tentatively ½ to 30 minutes, and this broader range should be automatically controlled to increase the "on" period with drop in temperature, and vice versa. By varying the air flow through the thermostat in accordance with the present invention, this ideal condition is closely approached, droop drastically reduced, and much more satisfactory results automatically obtained over a wider range of outdoor temperatures, than is possible solely with present day commercial thermostats of the heat anticipation type.

Other modes of applying the principle of my invention may be employed instead of those explained, change being made as regards the means and methods herein disclosed, provided those stated by any of the following claims or their equivalent be employed.

I therefore particularly point out and distinctly claim as my invention:

1. The combination of a thermostat assembly for controlling the temperature in a room or the like and having an electric circuit with a heat actuated member as part of same, an electrically operated heater, electric circuit connections which operably join said heater in the electric circuit of said heat actuated member, and a separate tubular means extending between the thermostat and outside atmosphere for continuously flowing air in varying but unobstructed and predetermined unidirectional manner through said thermostat assembly to the outer atmosphere in the presence of varying atmospheric conditions for controlling the effect of said heating means on the operation of said heat actuated member.

2. In combination with an electrically heated temperature rise anticipation thermostat for dwellings and the like, a tube for a gaseous fluid, and in communication with the atmosphere for creating variable suction pressure which varies with atmospheric conditions, said tube opening at one end into said thermostat in the zone of greater heat while its other end is connected to said variable suction pressure creating means for flowing gaseous fluid through said tube from said thermostat to said variable suction pressure creating means, whereby the electric heating of the thermostat is less effective in cold weather than in hot.

3. The combination of a thermostat assembly having an electric circuit including a heat actuated member for use in controlling the temperature in a room or the like, an electrically operated heater for supplying a small amount of heat to said thermostat, said heater delivering heat to said thermostat when operably connected thereto and the electric circuit through the heat actuated member is closed, a tube extending into said thermostat in proximity of said heater, means for creating variable suction pressure which is greater in cold weather than in hot weather, and means for connecting said tube to said variable suction pressure creating means in manner creating a fluid flow into said tube from said thermostat, wherein such flow varies the effect of said electric heater on the operation of said heat actuated member and produces longer operating runs in cold weather.

GORDON McLARTY.

REFERENCES CITED

The following references are of record in the file of this patent:

UNITED STATES PATENTS

| Number | Name | Date |
| --- | --- | --- |
| 1,583,496 | Shafer | May 4, 1926 |
| 1,760,082 | Parks | May 27, 1930 |
| 1,871,093 | Stem | Aug. 9, 1932 |
| 1,883,251 | Spencer | Oct. 18, 1932 |
| 1,944,721 | Sell | June 23, 1934 |
| 1,981,679 | Stem | Nov. 20, 1934 |
| 2,056,769 | Buchting | Oct. 6, 1936 |
| 2,259,061 | Caffier | Oct. 14, 1941 |